(12) United States Patent
Wang

(10) Patent No.: US 12,093,115 B2
(45) Date of Patent: Sep. 17, 2024

(54) METHOD FOR ADJUSTING POWER OF PROCESSOR AND APPARATUS

(71) Applicant: Huawei Technologies Co., Ltd., Shenzhen (CN)

(72) Inventor: Youwen Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 47 days.

(21) Appl. No.: 17/843,414

(22) Filed: Jun. 17, 2022

(65) Prior Publication Data

US 2022/0326759 A1 Oct. 13, 2022

Related U.S. Application Data

(63) Continuation of application No. PCT/CN2020/113280, filed on Sep. 3, 2020.

(30) Foreign Application Priority Data

Dec. 20, 2019 (CN) .......................... 201911328960.X
Dec. 31, 2019 (CN) .......................... 201911424047.X

(51) Int. Cl.
G06F 1/3296 (2019.01)
G06F 1/3206 (2019.01)
G06F 11/07 (2006.01)

(52) U.S. Cl.
CPC .......... *G06F 1/3296* (2013.01); *G06F 1/3206* (2013.01); *G06F 11/076* (2013.01)

(58) Field of Classification Search
CPC ..... G06F 11/076; G06F 1/3206; G06F 1/3296

USPC .......................................... 713/320
See application file for complete search history.

(56) References Cited

U.S. PATENT DOCUMENTS

| 8,429,441 B2* | 4/2013 | Baker ................ G06F 1/3203 712/32 |
| 9,547,027 B2* | 1/2017 | Varma ................ G06F 1/3203 |
| 10,229,027 B2* | 3/2019 | Luo .................... G06F 11/3072 |
| 10,802,573 B2* | 10/2020 | Chen .................. H05K 7/1492 |
| 2010/0115293 A1 | 5/2010 | Rotem et al. |
| 2011/0055596 A1 | 3/2011 | Wyatt |
| 2011/0154066 A1 | 6/2011 | Ravichandran et al. |
| 2012/0023345 A1 | 1/2012 | Naffziger et al. |
| 2012/0159201 A1 | 6/2012 | Distefano et al. |
| 2012/0331310 A1* | 12/2012 | Burns ................. G06F 1/3287 713/300 |
| 2013/0173946 A1* | 7/2013 | Rotem ................ G06F 1/3206 713/340 |
| 2013/0339757 A1 | 12/2013 | Reddy |
| 2014/0068282 A1 | 3/2014 | Jenne |
| 2014/0173309 A1* | 6/2014 | Iwai ....................... G06F 1/263 713/320 |

(Continued)

FOREIGN PATENT DOCUMENTS

CN 1979433 A 6/2007
CN 102156498 A 8/2011

(Continued)

*Primary Examiner* — Brian T Misiura
(74) *Attorney, Agent, or Firm* — Conley Rose, P.C.

(57) ABSTRACT

A method for enabling a power of a processor to exceed preset thermal design power (TDP) includes monitoring a usage of the processor; and adjusting a TDP when the usage exceeds a threshold such that an adjusted power of the processor exceeds the preset TDP.

20 Claims, 7 Drawing Sheets

(56) References Cited

U.S. PATENT DOCUMENTS

| | | | |
|---|---|---|---|
| 2015/0095666 A1* | 4/2015 | Ananthakrishnan | G06F 1/206 |
| | | | 713/300 |
| 2015/0346798 A1 | 12/2015 | Dongara et al. | |
| 2016/0266629 A1* | 9/2016 | Merrikh | G06F 1/206 |
| 2017/0068309 A1 | 3/2017 | Toosizadeh et al. | |
| 2017/0220362 A1* | 8/2017 | Jenne | G06F 1/26 |
| 2019/0107872 A1 | 4/2019 | Thomas et al. | |

FOREIGN PATENT DOCUMENTS

| | | |
|---|---|---|
| CN | 103261992 A | 8/2013 |
| CN | 105843571 A | 8/2016 |
| IN | 105262155 A | 1/2016 |
| JP | 2010190752 A | 9/2010 |
| JP | 2012048545 A | 3/2012 |

\* cited by examiner

METHOD FOR ADJUSTING POWER OF PROCESSOR AND APPARATUS

CROSS-REFERENCE TO RELATED APPLICATIONS

This is a continuation of International Patent Application No. PCT/CN2020/113280 filed on Sep. 3, 2020, which claims priority to Chinese Patent Application No. 201911328960.X filed on Dec. 20, 2019 and Chinese Patent Application No. 201911424047.X filed on Dec. 31, 2019. All of the aforementioned patent applications are hereby incorporated by reference in their entireties.

TECHNICAL FIELD

This disclosure relates to the field of semiconductor chips, and in particular, to a method for adjusting power of a processor.

BACKGROUND

In the field of semiconductor chips, because a large quantity of electronic components is integrated in a small area, a heat dissipation capability of a chip is one of main bottlenecks that limit increase of a frequency and a quantity of cores of the chip. To ensure that a processor runs reliably for a long time and prevent the processor from being damaged due to heating, the processor is usually limited to a specific power consumption range during working. Performance of the processor is mainly affected by power of the processor. In other words, the performance of the processor is affected by the power consumption range of the processor.

In industrial practice, a processor manufacturer usually sets specific maximum power consumption, referred to as thermal design power (TDP), for a processor of each model based on a heat dissipation capability and power of the processor of the model. Although the TDP helps protect the processor from being damaged due to overheating, the TDP also limits maximum performance of the processor. Short-term service traffic bursts in many service scenarios. To meet these burst high computing performance requirements that last for a short time, a processor with a computing capability far exceeding an average computing capability requirement needs to be used. As a result, costs for enterprises to purchase hardware devices are greatly increased.

SUMMARY

To resolve a problem in the conventional technology that maximum power of a processor is difficult to meet a burst high computing performance requirement due to limitation of fixed TDP, this disclosure provides a method for adjusting power of a processor. When usage of the processor exceeds a threshold, the power of the processor can be adjusted, so that adjusted power of the processor exceeds TDP corresponding to the processor, thereby improving computing performance of the processor in a short time.

According to a first aspect, this disclosure provides a method for adjusting power of a processor. The method is used in a computer apparatus, the computer apparatus includes the processor, and the method includes determining that usage of the processor exceeds a first threshold, and adjusting TDP of the processor, where adjusted TDP of the processor is greater than the preset TDP of the processor.

According to the method, the computer apparatus can temporarily adjust the TDP of the processor when the usage of the processor reaches a specific degree. Because the processor usually has a power protection function, when power of the processor reaches or approaches the TDP, the power of the processor is reduced in a manner such as reducing a frequency. Therefore, in this method, the TDP of the processor is increased, so that the power of the processor can exceed the preset TDP without triggering the power protection function, thereby meeting a requirement of a current service for performance of the processor.

According to the first aspect, in an implementation of this disclosure, before adjusting TDP of the processor, the method further includes obtaining a current temperature of the processor, and determining that a difference between a highest temperature of the processor and the current temperature of the processor is greater than or equal to a second threshold.

According to the method, before the TDP of the processor is adjusted, whether there is a sufficient margin from the current temperature of the processor to the highest temperature can be first determined, thereby improving system stability.

According to the first aspect, in another implementation of this disclosure, before adjusting TDP of the processor, the method further includes obtaining a current rotational speed of a fan, where the fan is configured to dissipate heat for the processor, and determining that a ratio of the current rotational speed of the fan to a maximum rotational speed of the fan is less than or equal to a third threshold.

According to the method, before the TDP of the processor is adjusted, whether the computer apparatus has a margin of a heat dissipation capability of the processor can be first determined, so that the temperature of the processor can still be kept within a safe range after the power of the processor increases, thereby improving running stability of the computer apparatus.

According to the first aspect, in another implementation of this disclosure, before adjusting TDP of the processor, the method further includes determining an increment in TDP of the processor, sending an electric energy request to a power supply controller, where the electric energy request carries information about the increment in TDP of the processor, and receiving a response sent by the power supply controller, where the response is used to indicate that the power supply controller has allocated electric energy corresponding to the increment in TDP of the processor to the computer apparatus.

According to the foregoing method, before the TDP of the processor is adjusted, the corresponding electric energy can be first requested from the power supply controller based on the increment in TDP of the processor, so that sufficient electric energy can be provided for the processor with increased power, thereby improving running stability of the computer apparatus.

According to the first aspect, in another implementation of this disclosure, after adjusting TDP of the processor, the method further includes monitoring a quantity of errors that occur in the processor within a specified period of time, and reducing the TDP of the processor when the quantity of errors that occur in the processor within the specified period of time is greater than or equal to a fourth threshold.

According to the method, after the TDP of the processor is adjusted, the quantity of errors occur in the processor within the specified period of time is monitored to monitor working reliability of the processor. When there is an excessively large quantity of errors occur in the processor within the specified period, the TDP of the processor is reduced, thereby improving running reliability of the computer apparatus.

According to the first aspect, in another implementation of this disclosure, after adjusting TDP of the processor, the method further includes monitoring duration in which the processor runs at power exceeding the preset TDP, and sending an alarm when the duration in which the processor runs at the power exceeding the preset TDP exceeds a fifth threshold.

According to the method, after the TDP of the processor is adjusted, the running duration of the processor at the power exceeding the preset TDP can be monitored. When the processor runs at the power for a long time, running reliability of the computer apparatus and a service life of the processor are affected. Therefore, the alarm needs to be sent to notify a user to select a processor with higher rated power.

According to the first aspect, in another implementation of this disclosure, a step of adjusting TDP of the processor further includes determining the adjusted TDP of the processor based on the difference between the highest temperature of the processor and the current temperature of the processor and the ratio of the current rotational speed of the fan to the maximum rotational speed of the fan.

According to the method, the TDP added by the processor can be determined based on the margin of the heat dissipation capability of the processor in the computer apparatus, thereby improving running stability of the computer apparatus and running efficiency of the processor.

According to the first aspect, in another implementation of this disclosure, adjusting TDP of the processor includes adjusting the TDP of the processor by using a basic input/output system (BIOS) or a baseband management controller (BMC) in the computer apparatus.

According to a second aspect, this disclosure provides a method for adjusting power of a processor. The method is used in a computer apparatus, the computer apparatus includes the processor, and the method includes determining that usage of the processor exceeds a first threshold, and adjusting a current obtained by the processor through monitoring to increase a voltage of the processor, where an adjusted current obtained by the processor through monitoring is less than an actual current of the processor.

According to the method, the computer apparatus can adjust power of the processor in a manner of decreasing the current obtained by the processor through monitoring. When the power of the processor is monitored, the current obtained by the processor through monitoring can be modified. Therefore, according to this method, when actual power of the processor has exceeded preset TDP, the obtained power of the processor through monitoring has not exceeded the preset TDP, so that the power of the processor can be adjusted without triggering a power protection function.

According to the second aspect, in an implementation of this disclosure, before adjusting a current obtained by the processor through monitoring, the method further includes obtaining a current temperature of the processor, and determining that a difference between a highest temperature of the processor and the current temperature of the processor is greater than or equal to a second threshold.

According to the second aspect, in another implementation of this disclosure, before adjusting a current obtained by the processor through monitoring, the method further includes obtaining a current rotational speed of a fan, where the fan is configured to dissipate heat for the processor, and determining that a ratio of the current rotational speed of the fan to a maximum rotational speed of the fan is less than or equal to a third threshold.

According to the second aspect, in another implementation of this disclosure, before adjusting a current obtained by the processor through monitoring, the method further includes predicting an increment in power of the processor, sending an electric energy request to a power supply controller based on the increment, where the electric energy request carries the predicted increment in power of the processor, and receiving a response sent by the power supply controller, where the response is used to indicate that the power supply controller has allocated electric energy corresponding to the increment in power of the processor to the computer apparatus.

According to the second aspect, in another implementation of this disclosure, after adjusting a current obtained by the processor through monitoring, the method further includes monitoring a quantity of errors that occur in the processor within a specified period of time, and when the quantity of errors that occur in the processor within the specified period of time is greater than or equal to a fourth threshold, increasing the current obtained by the processor through monitoring.

According to the second aspect, in another implementation of this disclosure, after adjusting a current obtained by the processor through monitoring, the method further includes monitoring duration in which the processor runs at power exceeding preset TDP, and sending an alarm when the duration in which the processor runs at the power exceeding the preset TDP exceeds a fifth threshold.

According to the second aspect, in another implementation of this disclosure, adjusting a current obtained by the processor through monitoring includes determining the adjusted current obtained by the processor through monitoring based on the difference between the highest temperature of the processor and the current temperature of the processor and the ratio of the current rotational speed of the fan to the maximum rotational speed of the fan.

According to a third aspect, this disclosure provides a computer apparatus. The computer apparatus includes a processing module, a monitor module configured to determine that usage of the processing module exceeds a first threshold, and an adjustment module configured to adjust TDP of the processing module, where adjusted TDP of the processing module is greater than the preset TDP of the processing module.

According to the third aspect, in an implementation of this disclosure, the monitor module is further configured to obtain a current temperature of the processing module before the adjustment module adjusts the TDP of the processing module, and determine that a difference between a highest temperature of the processing module and the current temperature of the processing module is greater than or equal to a second threshold.

According to the third aspect, in another implementation of this disclosure, the monitor module is further configured to obtain a current rotational speed of a fan before the adjustment module adjusts the TDP of the processing module, where the fan is configured to dissipate heat for the processing module, and determine that a ratio of the current rotational speed of the fan to a maximum rotational speed of the fan is less than or equal to a third threshold.

According to the third aspect, in another implementation of this disclosure, the monitor module is further configured to determine an increment in TDP of the processing module before the adjustment module adjusts the TDP of the processing module, send an electric energy request to a power supply controller, where the electric energy request carries information about the increment in TDP of the processing module, and receive a response sent by the power supply controller, where the response is used to indicate that the power supply controller has allocated electric energy corresponding to the increment in TDP of the processing module to the computer apparatus.

According to the third aspect, in another implementation of this disclosure, the monitor module is further configured to monitor a quantity of errors that occur in the processing module within a specified period of time after the adjustment module adjusts the TDP of the processing module, and the adjustment module is further configured to reduce the TDP of the processing module when the quantity of errors that occur in the processing module within the specified period of time is greater than or equal to a fourth threshold.

According to the third aspect, in another implementation of this disclosure, the monitor module is further configured to, after the adjustment module adjusts the TDP of the processing module and the adjustment module adjusts current obtained by the processing module through monitoring, monitor duration in which the processing module runs at power exceeding the preset TDP, and send an alarm when the duration in which the processing module runs at the power exceeding the preset TDP exceeds a fifth threshold.

According to the third aspect, in another implementation of this disclosure, the monitor module is configured to determine the adjusted TDP of the processing module based on the difference between the highest temperature of the processing module and the current temperature of the processing module and the ratio of the current rotational speed of the fan to the maximum rotational speed of the fan.

According to the third aspect, in another implementation of this disclosure, the adjustment module is configured to adjust the TDP of the processing module by using a BIOS or a BMC in the computer apparatus.

According to a fourth aspect, this disclosure provides a computer apparatus. The computer apparatus includes a processing module, a monitor module configured to determine that usage of the processing module exceeds a first threshold, and an adjustment module configured to adjust a current obtained by the processing module through monitoring, where an adjusted current obtained by the processing module through monitoring is less than an actual current of the processing module.

According to the fourth aspect, in an implementation of this disclosure, the monitor module is further configured to obtain a current temperature of the processing module before the adjustment module adjusts the current obtained by the processing module through monitoring, and determine that a difference between a highest temperature of the processing module and the current temperature of the processing module is greater than or equal to a second threshold.

According to the fourth aspect, in another implementation of this disclosure, the monitor module is further configured to obtain a current rotational speed of a fan before the adjustment module adjusts the current obtained by the processing module through monitoring, where the fan is configured to dissipate heat for the processing module, and determine that a ratio of the current rotational speed of the fan to a maximum rotational speed of the fan is less than or equal to a third threshold.

According to the fourth aspect, in another implementation of this disclosure, the monitor module is further configured to predict power added by the processing module before the adjustment module adjusts the current obtained by the processing module through monitoring, send an electric energy request to a power supply controller, where the electric energy request carries the power added by the processing module, and receive a response sent by the power supply controller, where the response is used to indicate that the power supply controller has allocated electric energy of the power added by the processing module to the computer apparatus.

According to the fourth aspect, in another implementation of this disclosure, the monitor module is further configured to monitor a quantity of errors that occur in the processing module within a specified period of time after the adjustment module adjusts the current obtained by the processing module through monitoring, and the adjustment module is further configured to, when the quantity of errors that occur in the processing module within the specified period of time is greater than or equal to a fourth threshold, adjust the obtained current by the processing module through monitoring.

According to the fourth aspect, in another implementation of this disclosure, the monitor module is further configured to, after the adjustment module adjusts the current obtained by the processing module through monitoring, monitor duration in which the processing module runs at power exceeding the preset TDP, and send an alarm when the duration in which the processing module runs at the power exceeding the preset TDP exceeds a fifth threshold.

According to the fourth aspect, in another implementation of this disclosure, the monitor module is configured to determine the current obtained, through monitoring, by the processing module based on the difference between the highest temperature of the processing module and the current temperature of the processing module and the ratio of the current rotational speed of the fan to the maximum rotational speed of the fan.

According to the fourth aspect, in another implementation of this disclosure, the adjustment module is configured to adjust, by using a BIOS or a BMC in the computer apparatus, the current obtained, through monitoring, by the processing module.

According to a fifth aspect, this disclosure provides a computer apparatus. The computer apparatus includes a memory and a processor, the memory is configured to store program code, and the processor is configured to invoke the program code in the storage to perform the method provided in any implementation of the first aspect or the second aspect.

According to a sixth aspect, this disclosure provides a computer-readable storage medium. The computer-readable storage medium stores program code, and the program code may be invoked by a computer apparatus to perform the method provided in any implementation of the first aspect or the second aspect.

According to a seventh aspect, this disclosure provides a processor. The processor includes a monitor module and a core, the monitor module is configured to determine that usage of the processor exceeds a first threshold, and the core is configured to adjust TDP of the processor, where adjusted TDP of the processor is greater than the preset TDP of the processor.

According to the seventh aspect, in an implementation of this disclosure, before the core adjusts the TDP of the processor, the monitor module is further configured to obtain a current temperature of the processor, and determine that a difference between a highest temperature of the processor and the current temperature of the processor is greater than or equal to a second threshold.

According to the seventh aspect, in another implementation of this disclosure, before the core adjusts the TDP of the processor, the monitor module is further configured to obtain a current rotational speed of a fan, where the fan is configured to dissipate heat for the processor, and determine that a ratio of the current rotational speed of the fan to a maximum rotational speed of the fan is less than or equal to a third threshold.

According to the seventh aspect, in another implementation of this disclosure, before the core adjusts the TDP of the processor, the monitor module is further configured to determine an increment in TDP of the processor, send an electric energy request to a power supply controller based on the increment, where the electric energy request carries the increment in TDP of the processor, and receive a response sent by the power supply controller, where the response is used to indicate that the power supply controller has allocated electric energy corresponding to the increment in TDP of the processor to a computer apparatus.

According to the seventh aspect, in another implementation of this disclosure, after the core adjusts the TDP of the processor, the monitor module is further configured to monitor a quantity of errors that occur in the processor within a specified period of time, and reduce the TDP of the processor when the quantity of errors that occur in the processor within the specified period of time is greater than or equal to a fourth threshold.

According to the seventh aspect, in another implementation of this disclosure, after the core adjusts the TDP of the processor, the monitor module is further configured to monitor duration in which the processor runs at power exceeding the preset TDP, and send an alarm when the duration in which the processor runs at the power exceeding the preset TDP exceeds a fifth threshold.

According to the seventh aspect, in another implementation of this disclosure, the monitor module is configured to determine the adjusted TDP of the processor based on the difference between the highest temperature of the processor and the current temperature of the processor and the ratio of the current rotational speed of the fan to the maximum rotational speed of the fan.

According to the seventh aspect, in another implementation of this disclosure, the core is configured to adjust the TDP of the processor by using a BIOS or a BMC in the computer apparatus.

DESCRIPTION OF EMBODIMENTS

TDP is mainly used to guide thermal design work of a processor, and appropriately limit maximum working power consumption of the processor, so as to better balance heat dissipation costs and performance benefits. In a current design, TDP of a processor is a fixed value. When designing processors, a processor manufacturer sets TDP for each model of processor based on features of the processors of different models. Factors considered in setting the TDP include a wafer leakage current, a gate capacitor, a quantity of transistors, and the like of the processor, and these factors affect heating and a heat dissipation capability of the processor. In practice, current manufacturers classify a model of a processor based on a frequency of the processor and a quantity of processor cores, and set TDP. The TDP corresponding to the processor of each model is fixed.

With the development of current heat dissipation technologies such as liquid cooling and air cooling, more means are used to reduce a temperature of the processor, and costs are increasingly low. This means that the working temperature of the processor can be reduced, so that the processor works at higher power, thereby providing a higher frequency and stronger computing performance. However, because the current TDP is fixed, and performance of the processor cannot be further improved due to limitation of maximum power. When short-term service traffic bursts in a service scenario, better computing performance to meet a short-term burst high-performance computing requirement cannot be provided. As a result, only a processor with a computing capability far higher than a conventional required computing capability can be selected, which significantly increases hardware deployment costs.

To enable a processor to provide an additional computing capability in a short time, this disclosure provides a method, so that when power of the processor reaches or approaches TDP, the TDP can be adjusted, thereby further increasing the power of the processor.

Figure 1:
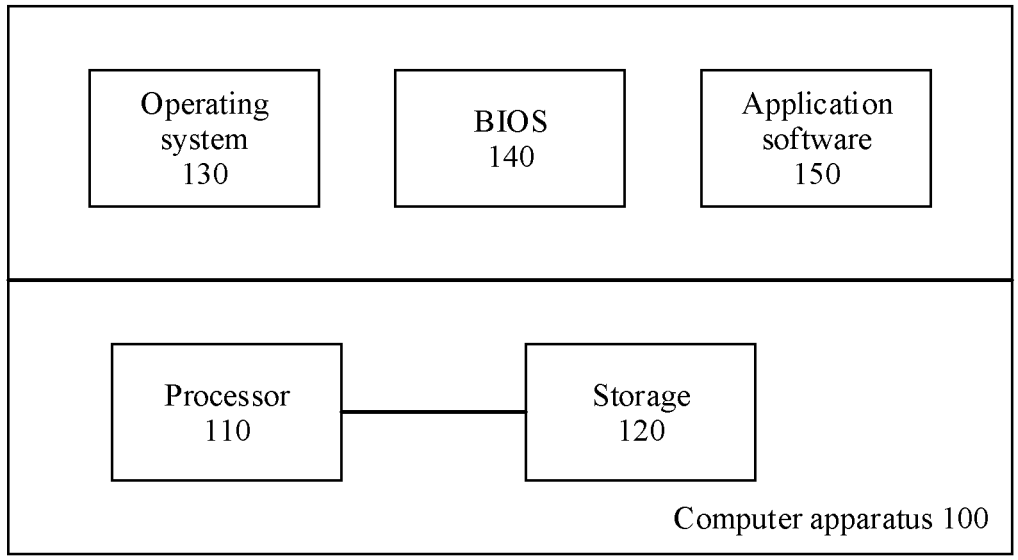
FIG. 1 is a schematic diagram of an architecture of a computer apparatus according to this disclosure.

FIG. 1 is a schematic diagram of an architecture of a computer apparatus according to this disclosure.

As shown in FIG. 1, the computer apparatus 100 may be divided into two parts: hardware and software. The hardware part includes a processor 110 and a storage 120. The processor 110 is a control center of the computer apparatus 100 and is configured to execute a related program, so as to implement the technical solutions provided in embodiments of the present disclosure. The storage 120 may store an operating system and other application software. When the technical solutions provided in embodiments of the present disclosure are implemented by using software or firmware, code used to implement the technical solutions provided in embodiments of the present disclosure is stored in the storage 120, and is executed by the processor 110. The storage 120 may be integrated with the processor 110 or integrated inside the processor 110, or may be one or more storage units independent of the processor 110.

The software part includes an operating system 130, a BIOS 140, and application software 150. The operating system 130 is system software that manages computer hardware and software resources, and is also a kernel and a cornerstone of the computer apparatus. The operating system needs to handle basic transactions, for example, managing and configuring a memory, determining a priority of a system resource supply and demand, controlling input and output devices, operating a network, and managing a file system. To facilitate user operations, most operating systems provide an operation interface for a user to interact with the system.

The BIOS is used to run hardware initialization during a power-on boot phase and provide runtime services for the operating system and programs. In addition to hardware initialization, the BIOS usually has functions such as displaying a temperature of a processor and adjusting a temperature protection policy.

As one of main categories of computer software, the application software, also referred to as an application program, is software written for a special application purpose of a user. For example, the application software may be a program used to implement power control, temperature management, and the like.

Figure 2:
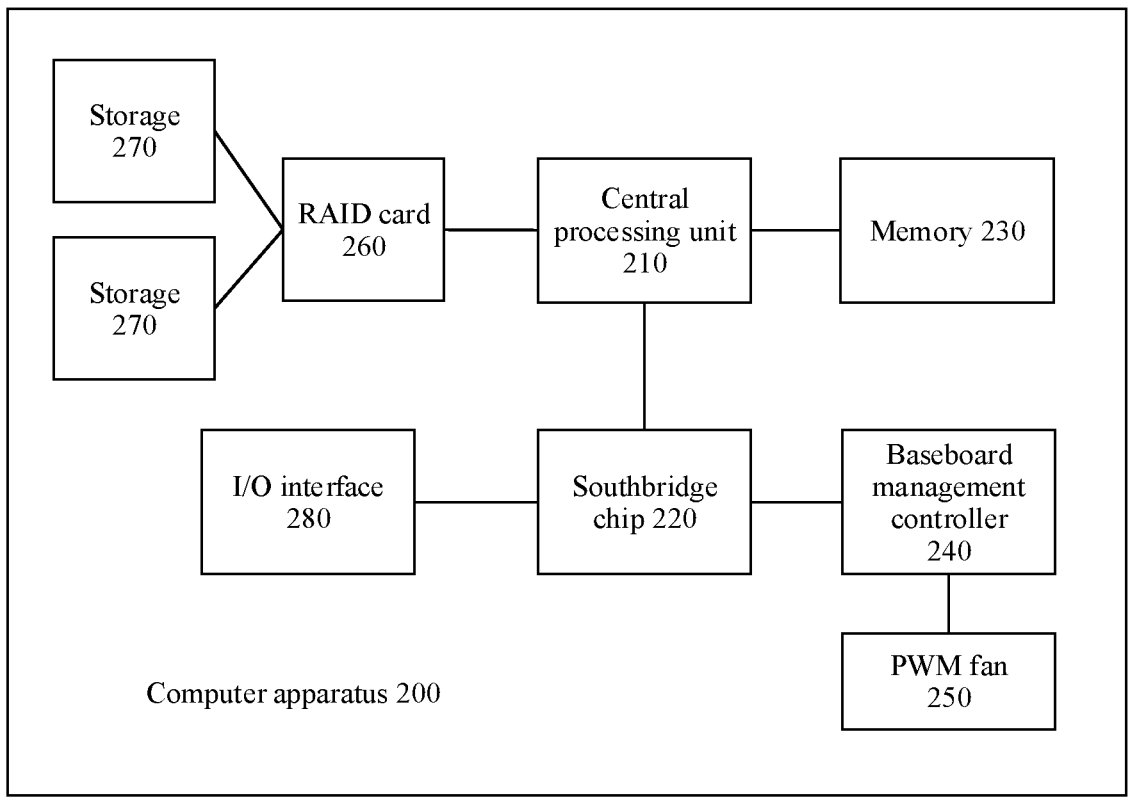
FIG. 2 is a schematic diagram of an architecture of another computer apparatus according to this disclosure.

FIG. 2 is a schematic diagram of an architecture of another computer apparatus according to this disclosure.

As shown in FIG. 2, the computer apparatus 200 includes a central processing unit (CPU) 210, a southbridge chip 220, a memory 230, a BMC 240, a pulse-width modulation (PWM) fan 250, a redundant array of independent disks (RAID) card 260, a storage 270, and an input/output (I/O) interface.

A function of the CPU 210 is similar to a function of the processor 110, and is mainly used to interpret computer instructions and process data in computer software. Details are not described herein again.

The storage 120 in FIG. 1 is divided into the memory 230 and the storage 270 in FIG. 2. The memory is also referred to as a main storage, and a function of the memory is to temporarily store operation data in the CPU 210 and exchange data with an external storage such as a hard disk. The storage 270 in FIG. 2 is a secondary storage, is characterized by a large capacity and a low price, and is usually configured to store a program and data that are not used temporarily. The storage 270 may be connected to the CPU 210 through the RAID card 260, where the RAID card 260 is configured to form a disk array by using a plurality of storages 270, so as to improve an error tolerance rate of data stored in the computer apparatus 200.

The southbridge chip 220 is a part of a motherboard chipset of the computer apparatus 200. The chipset includes a northbridge chip and the southbridge chip, where the northbridge chip is configured to process a high-speed signal. In a current design, the northbridge chip is usually integrated in the CPU, and therefore is not shown in FIG. 1. The southbridge chip 220 is configured to process a low-speed signal, and includes functions of most peripheral device interfaces, a multimedia controller, and a communications interface. The southbridge chip 220 may be connected to the CPU through the northbridge chip, or may be connected to the CPU integrated with the northbridge chip. In addition, the southbridge chip 220 may be connected to the BMC 240 through a Peripheral Component Interconnect Express (PCIe) interface.

The BMC 240 is connected to the southbridge chip 220, and is used to facilitate operations such as remote management, monitoring, installation, and restart of the computer apparatus. The BMC 240 is usually designed to run when the computer apparatus is powered on, so that the BMC 240 is independent of another program run by the computer apparatus, and can perform fault recovery when the computer apparatus fails.

The PWM fan 250 is a fan whose rotational speed may be adjusted, and the rotational speed of the PWM fan 250 may be adjusted by adjusting a voltage or adjusting a PWM signal. Further, the PWM signals may have different duty cycles. The rotational speed of the PWM fan 250 is set by entering a PWM signal with a specific duty cycle to the PWM fan 250.

The I/O interface 280 is used to exchange information between the computer apparatus 200 and an external device. The I/O interface may be a Universal Serial Bus (USB) port, a serial AT Attachment (ATA) (SATA) interface, or the like. This is not limited in this disclosure.

It should be noted that the CPU mentioned above is merely for ease of description, and a type of the processor is not limited in this disclosure, and may be a CPU, or may be a processor of another type such as a graphics processor unit (GPU), or a field-programmable gate array (FPGA).

Figure 3A:
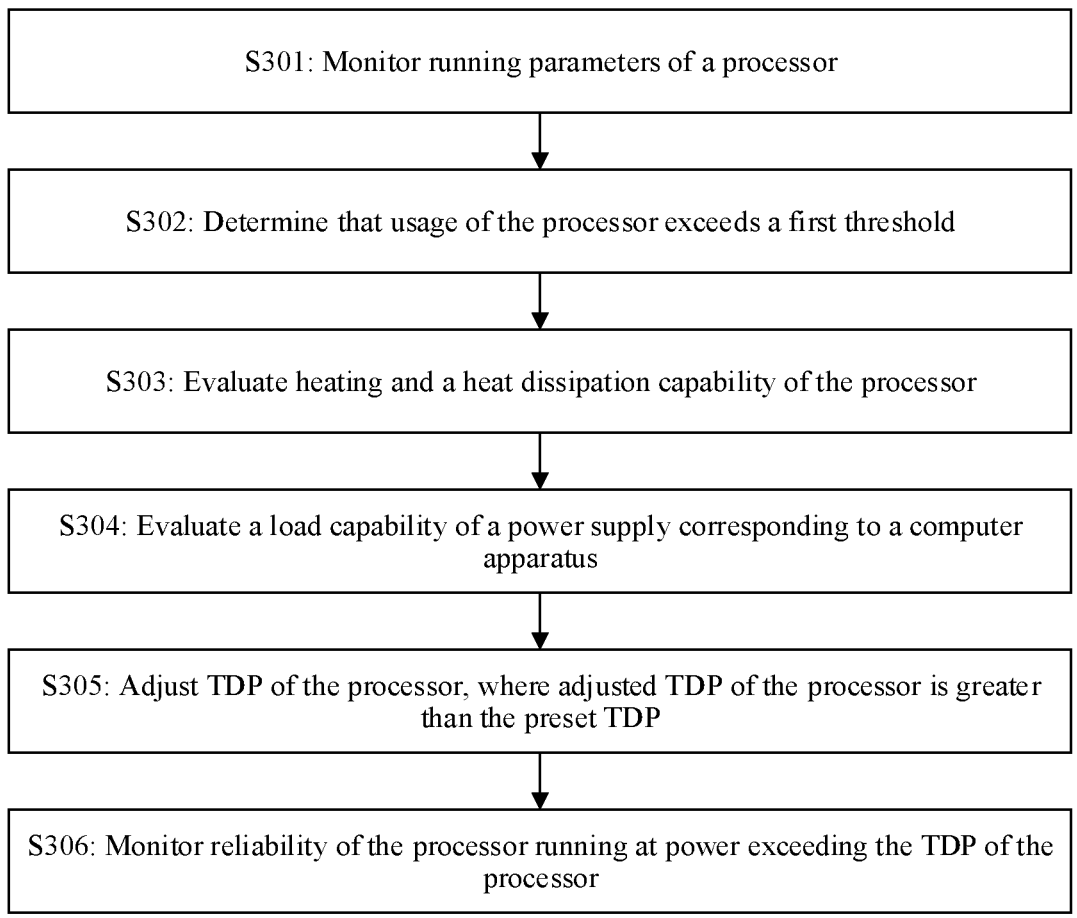
FIG. 3A is a schematic flowchart of an embodiment according to this disclosure.

FIG. 3A is a schematic flowchart of an embodiment according to this disclosure.

S301: Monitor running parameters of a processor.

Because the processor is an important component in a computer apparatus, and the processor generates large heat during running, the running parameters of the processor including usage, heating and a heat dissipation capability, power, and the like of the processor need to be monitored during running of the processor. The running parameters are as follows.

A running frequency of the processor indicates a quantity of operations performed by the processor per second, where time for performing one operation each time is referred to as a periodicity of the processor. For example, when the processor runs at a frequency of 1 gigahertz (GHz), it means that the processor performs 1 billion operations per second, and one second includes 1 billion periodicities of the processor. To enable the processor to run stably, the processor usually does not run in a full load. The processor performs operations in some periodicities of the processor, and remains in an idle mode in other periodicities. In a period of time, a ratio of a quantity of periodicities in which the processor performs operations to a total quantity of periodicities in the period of time is referred to as the usage of the processor.

Heating monitoring on the processor may be implemented by monitoring a temperature of the processor. The temperature of the processor usually includes a packaging case temperature Tcase of the processor and a junction temperature Tj of the processor, where the junction temperature is usually higher than the packaging case temperature. When heating of the processor is monitored, the packaging case temperature, or the junction temperature of the processor may be used for measurement. This is not limited in this disclosure.

The heat dissipation capability of the processor is usually related to a rotational speed of a fan. A higher rotational speed of the fan corresponding to the processor indicates a stronger heat dissipation capability, but also means a smaller margin of the heat dissipation capability. In an implementation of this embodiment of this disclosure, a ratio of revolutions per minute (RPM) of the fan to maximum revolutions per minute designed in the fan may be calculated. When the ratio is small, it indicates that the margin of the heat dissipation capability is large. In this case, heat dissipation does not become a bottleneck for improving the power of the processor. When the ratio is large, it indicates that the margin of the heat dissipation capability is small. In this case, it is not appropriate to increase the power of the processor. Otherwise, it is difficult to process heat increased due to increase of the power of the processor.

The power of the processor is determined based on a voltage applied to the processor and a current flowing through the processor. The processor usually includes a voltage detection apparatus, which may detect a current voltage of the processor. The current of the processor usually needs to be obtained from a component outside the processor. The computer apparatus determines, through monitoring, the power of the processor based on the detected voltage and the obtained current.

S302: Determine that the usage of the processor exceeds a first threshold.

A computing capability of the processor is positively correlated with the power and usage of the processor. When a difference between the power of the processor and TDP is large, if the computing capability of the processor needs to be improved, the power of the processor can be adjusted to improve the computing capability of the processor. When the difference between the power of the processor and the TDP is small, limitation of the TDP makes it difficult to further greatly increase the power of the processor. In this case, the usage of the processor can be increased to improve the computing capability of the processor.

When it is detected that the usage of the processor exceeds the first threshold in a specific period of time, it indicates that an increase margin of the computing capability of the processor is small, and a continuous increasing performance requirement cannot be met. In this case, if a short-term service with a high computing performance requirement bursts, the computing capability of the processor cannot meet the service requirement. To further improve the computing capability of the processor, the TDP needs to be adjusted, so that the power of the processor can be further increased based on adjusted TDP. The first threshold may be a fixed value, for example, 80%, or may be separately set based on different models of processors. This is not limited in this disclosure.

S303: Evaluate the heating and the heat dissipation capability of the processor.

Because a heat amount of the processor increases as the power of the processor increases, if the power of the processor needs to be increased, the heating and the heat dissipation capability of the computer apparatus need to be evaluated. The heating and the heat dissipation capability are evaluated from the following two aspects.

In a first aspect, a difference between a highest temperature that can be tolerated by the processor and a current temperature of the processor is considered. The highest temperature of the processor is a maximum temperature that can be tolerated by a component included in the processor without damage. Although some manufactures provide a temperature protection function during producing the processor to ensure that the processor is not damaged due to overheating, in an implementation provided in this disclosure, to ensure that the processor is not damaged due to overheating caused by power exceeding the TDP, and is applicable to more scenarios, the difference between the highest temperature of the processor and the current temperature of the processor is first calculated before the power of the processor is increased, that is, a margin by which the current temperature of the processor can be further increased. If the difference is greater than or equal to a second threshold, it indicates that the temperature of the processor still has room for increase, and the power of the processor can be increased in this case, or if the difference is less than or equal to a second threshold, it indicates that the temperature of the processor is close to the highest temperature, and it is inappropriate to further increase the power of the processor in this case. The second threshold may be a preset fixed value. For example, the second threshold is set to 30 degrees Celsius. When the highest temperature of the processor is 80 degrees Celsius, and the current temperature of the processor is 40 degrees Celsius, the difference between the highest temperature of the processor and the current temperature of the processor is 40 degrees Celsius, which is greater than the second threshold. Therefore, the power of the processor can be increased. In another implementation, the second threshold may be obtained by using a specific calculation method based on to-be-increased power of the processor. For example, when it is estimated that the power of the processor is increased by 20 watts (W), and it is obtained, by using the calculation method, that increasing the power of the processor by 20 W increases the temperature of the processor by 10 degrees Celsius, the 10 degrees Celsius is used as the second threshold.

In the foregoing calculation of the difference between the highest temperature that can be tolerated by the processor and the current temperature of the processor, the case temperature of the processor or a temperature of another part can be used. This is not limited in this disclosure.

In a second aspect, the margin of the heat dissipation capability of the computer apparatus is considered. Heat dissipation of the computer apparatus usually includes two types: air cooling and liquid cooling. Air cooling indicates that air is used as a medium for cooling a to-be-cooled object. For example, a fan is used to accelerate heat exchange between a heating component in the computer apparatus and surrounding air, and the fan and a component in the computer apparatus are combined to form an air duct in a chassis to enhance a heat dissipation effect. Water cooling indicates that liquid is driven by a pump to forcibly circulate to take away heat of a radiator, thereby reducing a temperature of a component in the computer apparatus. Most computer apparatuses dissipate heat for a processor through air cooling. Therefore, this embodiment is described by using an example in which heat dissipation is performed through air cooling.

When heat dissipation is performed through air cooling, the heat dissipation capability of the computer apparatus is mainly determined by a rotational speed of a fan. When the rotational speed of the fan is high, heat exchange between a heating component and surrounding air is more intense, and the heat dissipation capability is stronger. Each fan has its maximum revolutions per minute (RPM). For the fan that dissipates the heat for the processor, a ratio of current RPM of the fan to maximum RPM of the fan indicates a proportion of a heat dissipation capability that has been currently used by the computer apparatus for the processor. Therefore, this ratio needs to be considered when the power of the processor is increased. Further, when the ratio of the current RPM of the fan to the maximum RPM of the fan is less than or equal to a third threshold, it indicates that the computer apparatus currently does not use an excessive proportion of heat dissipation capability for the processor. Even if the processor generates more heat due to power increase, the computer apparatus can increase the rotational speed of the fan to enhance the heat dissipation capability for the processor. Therefore, the power of the processor can be increased. When the ratio of the current RPM of the fan to the maximum RPM of the fan is greater than a third threshold, it indicates that the computer apparatus currently uses an excessive proportion of the heat dissipation capability for the processor. When the processor generates more heat due to power increase, it is difficult for the computer apparatus to further improve the heat dissipation capability for the processor. Therefore, it is inappropriate to increase the power of the processor.

Liquid cooling is to use a pump to circulate coolant in a heat dissipation pipe and dissipate heat. A liquid cooling heat dissipation system usually has the following components: a liquid cooling block, circulating liquid, a pump, a pipe, and a liquid box or a heat exchanger. The liquid cooling block is a metal block with a channel reserved inside, and is made of copper or aluminum. The liquid cooling block is in contact with a heating component and absorbs heat of the heating component. The circulating liquid flows in the circulating pipe under an action of the water pump. Liquid that absorbs the heat of the heating component flows away from the liquid cooling block on the heating component, and new low-temperature circulating liquid continues to absorb the heat of the heating component. The pipe connects the pump, the liquid cooling block, and the liquid box. A function of the pipe is to enable the circulating liquid to circulate in the confined channel without leakage, so that the liquid cooling heat dissipation system works appropriately. The liquid box is used to store the circulating liquid. The heat exchanger is an apparatus similar to a heat sink. The circulating liquid transfers the heat to the heat sink with a large surface area, and a fan on the heat sink takes away the heat that flows into the air.

A heat dissipation capability in liquid cooling may be approximately obtained by using the following formula: $Q=c*m*dt$. Q is the heat dissipation capability of the liquid cooling system, c is a specific heat capacity of liquid, m is a mass of the liquid, and is positively correlated with a thickness of the liquid pipe and a flow rate of the liquid, the flow rate of the liquid is positively correlated with hydraulic pressure, and dt is a temperature difference between the liquid and a heat dissipation object. A heat dissipation margin of the liquid cooling heat dissipation system may be obtained and determined based on a current temperature of the liquid and a difference between current hydraulic pressure of a liquid pipe and maximum hydraulic pressure of the liquid cooling heat dissipation system or a ratio of current hydraulic pressure of a liquid pipe to maximum hydraulic pressure of the liquid cooling heat dissipation system. For example, whether a margin from the hydraulic pressure of the liquid pipe to a maximum hydraulic pressure of the liquid cooling heat dissipation system exceeds a preset value or whether a margin from the current temperature of the liquid to a maximum temperature that the processor can tolerate exceeds a preset value may be determined, so as to determine whether to release the limitation on the power of the processor.

S304: Evaluate a load capability of a power supply corresponding to the computer apparatus.

Figure 3B:
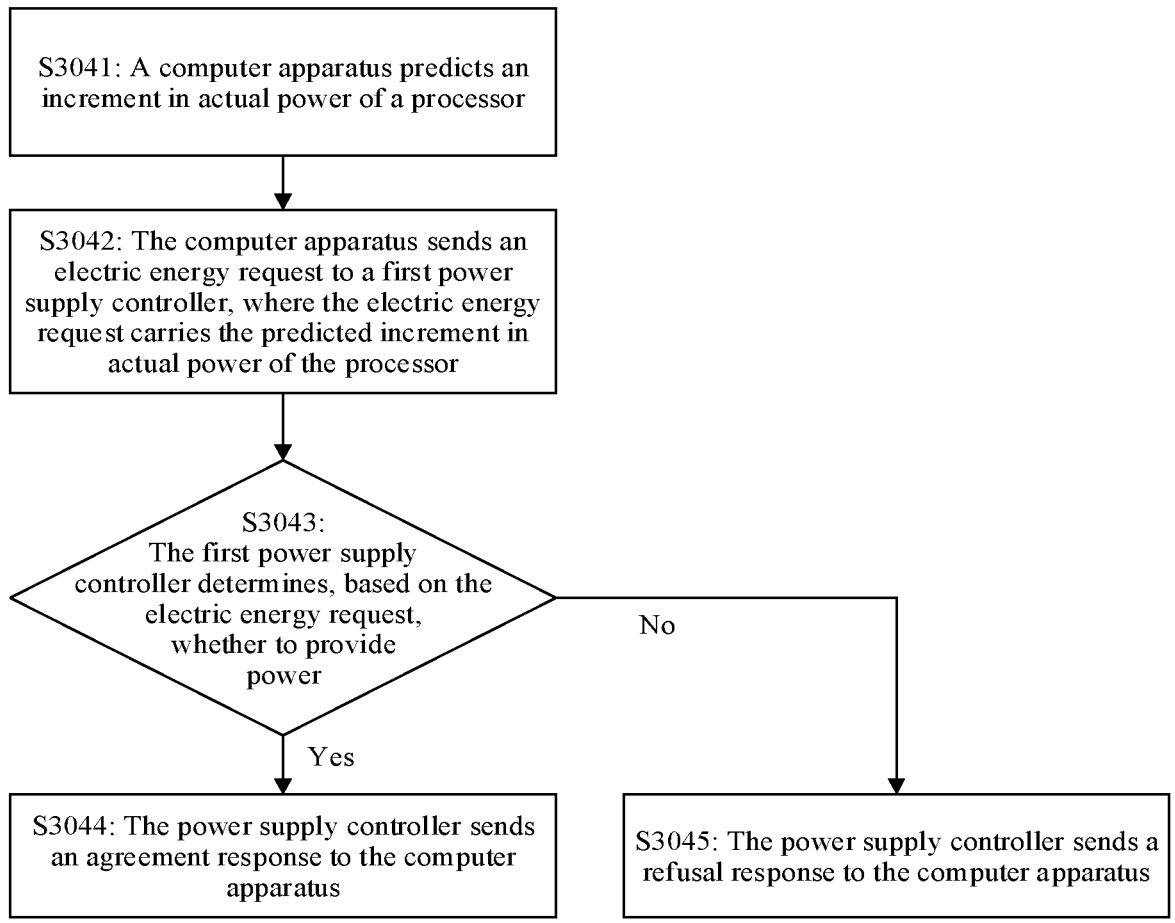
FIG. 3B is a schematic flowchart of another embodiment according to this disclosure.

If adjustment of the TDP of the processor results in increase of the actual power of the processor, whether the power supply corresponding to the computer apparatus can provide sufficient electric energy to support the increase in power needs to be determined in this case, that is, the load capability of the power supply is evaluated. As shown in FIG. 3B, a load capability of a power supply may be evaluated in the following several steps.

S3041: A computer apparatus predicts an increment in power of a processor.

S3042: The computer apparatus sends an electric energy request to a first power supply controller, where the electric energy request carries the predicted increment in power of the processor, the first power supply controller is configured to control power supply to the computer apparatus, and the predicted increment in power of the processor may be an increment in TDP of the processor.

S3043: The first power supply controller determines, based on the electric energy request, whether the predicted increment in power of the processor can be provided.

S3044: When the first power supply controller determines that the power supply can provide the increment in power of the processor, the first power supply controller sends an agreement response to the computer apparatus, where the agreement response is used to indicate that the first power supply controller will allocate or has allocated electric energy requested by the computer apparatus to the computer apparatus.

S3045: When the first power supply controller cannot provide the increment in power of the processor, the first power supply controller sends a refusal response to the computer apparatus, where the refusal response is used to indicate that the first power supply controller refuses to allocate electric energy requested by the computer apparatus to the computer apparatus because the first power supply controller determines that the power supply cannot provide the electric energy requested by the computer apparatus.

S305: Adjust the TDP of the processor, where adjusted TDP of the processor is greater than the preset TDP.

When it is determined that the usage of the processor exceeds the first threshold, the power of the processor needs to be further increased to meet the service requirement. In addition, when the processor has the sufficient heat dissipation capability margin and the power supply can provide the sufficient electric energy, the power of the processor may exceed the preset TDP. In this embodiment, the TDP may be increased, so that the power of the processor can be increased to a value between the preset TDP and the increased TDP. For example, original TDP is 50 W (watt, W), and the TDP is adjusted to 60 W according to the service requirement. After the TDP is adjusted, the power of the processor may increase to a value between 50 W and 60 W, so as to exceed the preset TDP.

In the first method, the TDP needs to be directly adjusted, but in the conventional technology, the TDP of processors of a same model are determined. Therefore, a TDP adjustment function may be preset during manufacturing of the processor provided in this disclosure, and the TDP can be adjusted according to the requirement. The TDP adjustment function may be implemented by using a BMC or a BIOS, or in a form of software code. This is not limited in this disclosure.

The TDP adjusting operation may be performed automatically or performed after confirmation of a user or an administrator.

In an implementation of this disclosure, the function is the automatic enabling function. The function is further adjusting the TDP when the power of the processor is close to the TDP. The function may be implemented by using a BIOS, a BMC, or software code.

In another implementation of this disclosure, the TDP is adjusted after confirmation of the user or the administrator. Further, when the computer apparatus needs to further increase the power of the processor to exceed the preset TDP, the computer system presents an adjustment request to the user, where the adjustment request is used to indicate the user to confirm whether the TDP is allowed to be adjusted. The adjustment request may be presented in a plurality of methods. A method for setting the adjustment request is not limited in this disclosure. For example, the adjustment request may be displayed on a display in a form of a pop-up window, and the user is prompted to select "yes" or "no" according to an actual situation. Alternatively, when the computer apparatus is connected to a loudspeaker, the computer apparatus may prompt, through a voice, the user to confirm whether the TDP is allowed to be adjusted.

In an implementation of this disclosure, the increment in TDP of the processor may be determined based on a current running parameter of the processor. For example, this disclosure provides the following quantization formula to determine adjusted TDP:

$$TDP_{fresh} = TDP_{init} + \left(\frac{(T_{jmax} - T_j)}{30} + \frac{(V_{max} - V_{current})}{Vmax}\right) * 5\% * TDP_{init}.$$

The parameters are described as follows: $TDP_{fresh}$ indicates the adjusted TDP, and $TDP_{init}$ indicates initial default TDP, $T_{jmax}$ indicates a highest temperature of a CPU, and $T_j$ indicates a current junction temperature of the CPU, and $V_{max}$ indicates a maximum rotational speed of a fan, and $V_{current}$ indicates a current rotational speed of the fan.

S306: Monitor reliability of the processor running at power exceeding the preset TDP of the processor.

Reliability of the processor is likely to be affected when the processor is running at the power exceeding the preset TDP of the processor of this type. Therefore, after the TDP is adjusted, reliability of the processor running at the current power needs to be evaluated. Reliability of the processor can be evaluated based on the junction temperature of the processor and a quantity of soft errors within a specified period of time.

A junction temperature indicates an actual working temperature of a semiconductor in an electronic device, and is also a highest temperature of an actual semiconductor chip (a wafer or a bare die) in the electronic device. If a working temperature of the processor exceeds a maximum junction temperature, a transistor in the processor is damaged and the component is invalid. The junction temperature can better reflect an actual condition of the processor than a surface temperature. To prevent the processor from being burnt due to overheating, the junction temperature is more appropriate for evaluating reliability of the processor during running. However, this disclosure sets no limitation on using the junction temperature to evaluate reliability of the processor during running. Using another temperature of the processor, including the surface temperature, to evaluate reliability of the processor during running also falls within the protection scope of this disclosure.

The soft error is an error caused due to an incorrect signal or incorrect data. In the computer apparatus, the soft error can cause a change in an instruction or one piece of data in a program. The soft errors are usually classified into an integrated circuit-level soft error and a system-level soft error. The integrated circuit-level soft error is usually caused because a high-energy particle hits an integrated circuit. For example, when a radioactive atom in an integrated circuit material decays, a particles are released and hit the integrated circuit. Because the a particles have positive charges and energy, if a storage unit is hit, a value in a storage unit may change. Atomic reaction in the foregoing example is very small and does not affect a hardware structure of the integrated circuit. The system-level soft error occurs when to-be-processed data is affected by noise or when the data is on a bus. A computer interprets the noise as data bits. As a result, program addressing or code processing errors occur. When the actual power of the processor exceeds the preset TDP, if the quantity of the soft errors generated within the specified period of time exceeds a fourth threshold, an alarm needs to be sent or the TDP of the processor needs to be directly reduced, so as to reduce the power of the processor.

In addition, in this disclosure, that the processor is allowed to run, in a short time, at the power higher than the preset TDP, is to meet the burst high computing performance requirement. If the processor runs in a high power mode for a long time, reliability of the computer system is affected, and a loss of the processor is accelerated. To avoid this case, the computer apparatus can monitor duration in which the processor runs at the power exceeding the preset TDP, or monitor a proportion of duration in which the processor runs at the power exceeding the preset TDP to entire working duration. If the working duration or the proportion exceeds a preset threshold, the alarm is sent to notify the user to use a processor with higher performance in time, so as to prevent the processor from working at the power exceeding the preset TDP for a long time.

Figure 5:
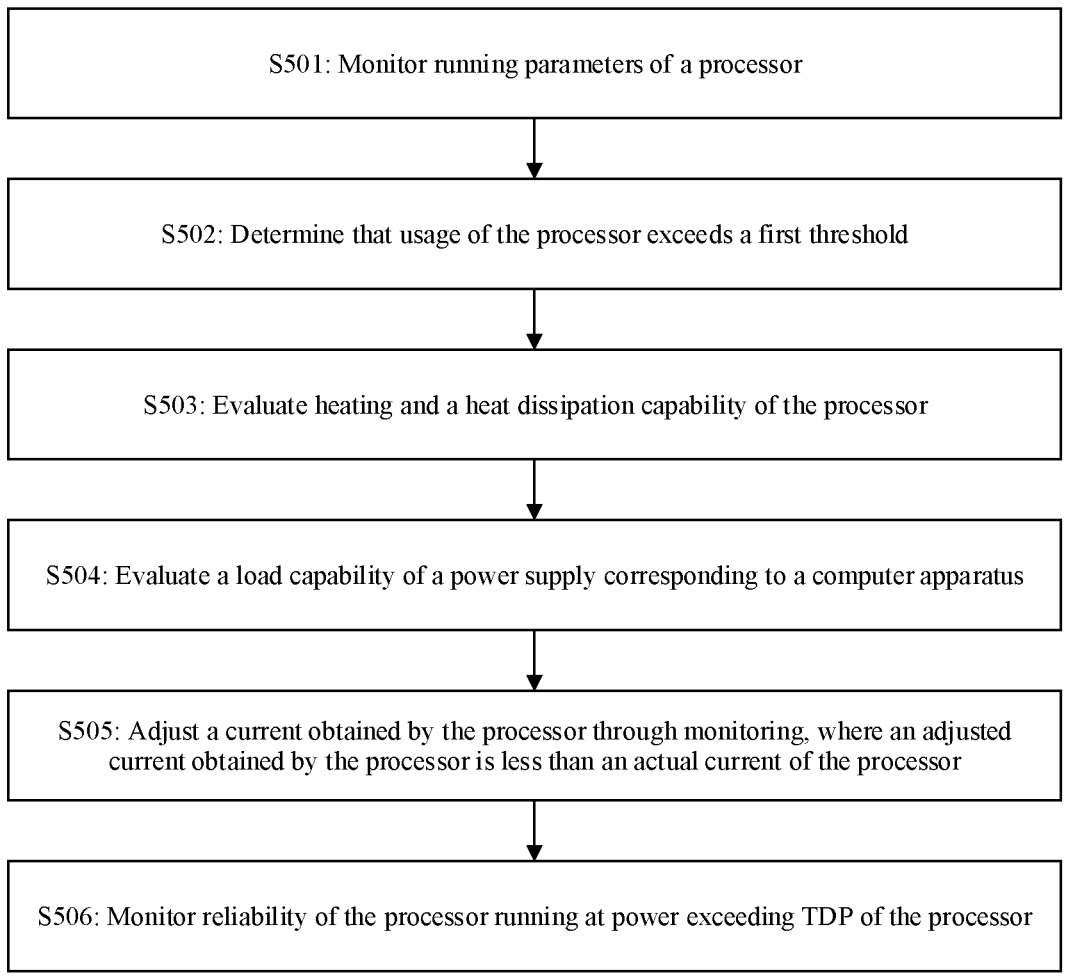
FIG. 5 is a schematic flowchart of another embodiment according to this disclosure.

FIG. 5 is a schematic flowchart of another embodiment according to this disclosure.

S501: Monitor running parameters of a processor.

S502: Determine that usage of the processor exceeds a first threshold.

S503: Evaluate heating and a heat dissipation capability of the processor.

S504: Evaluate a load capability of a power supply corresponding to a computer apparatus.

For the foregoing four steps, refer to steps S501, S502, S503, and S504 in FIG. 3A. Details are not described herein again.

S505: Adjust a current of the processor obtained through monitoring, where an adjusted current of the processor obtained through monitoring is less than the current of the processor.

To enable power of the processor to exceed preset TDP, the method for adjusting the TDP is already provided in FIG. 3A, and this embodiment provides another method. Because the processor obtains, through monitoring, the power of the processor based on voltage of the processor and the current obtained through monitoring, if the current of the processor obtained through monitoring is less than an actual current, the monitored power of the processor is also less than the current actual power of the processor, so that maximum power of the processor can actually be increased, thereby exceeding the preset TDP.

Figure 4:
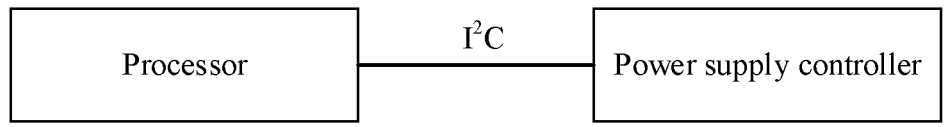
FIG. 4 is a schematic diagram of an architecture of a connection between a processor and a power supply controller according to this disclosure.

As shown in FIG. 4, a processor and a second power supply controller are connected through a bus, and the second power supply controller is configured to control power supply to the processor. The bus may be an Inter-Integrated Circuit (I²C or I2C) bus, or may be another type of bus. This is not limited in this disclosure. The processor may obtain the current voltage of the processor, and obtain the current obtained from the second power supply controller through monitoring. The processor may obtain, through monitoring, the current power of the processor based on the current voltage and the current monitored current. A processor manufacturer usually installs a power protection function for the processor. When the processor detects that the current monitored power is equal to or close to the TDP, the processor reduces a frequency of the processor. The voltage of the processor is positively correlated to the frequency of the processor. When the frequency of the processor is reduced, the voltage of the processor is also reduced, thereby reducing the power of the processor.

To enable the actual power of the processor to exceed the preset TDP, triggering of the power protection function of the processor may be avoided by enabling the monitored power of the processor to be less than the actual power of the processor. The processor may obtain the voltage of the processor, but the computer apparatus cannot change the voltage. However, the computer apparatus may change, by using a method such as changing a parameter stored in a register of the second power supply controller, the current obtained by the processor. Therefore, in an implementation of this embodiment of this solution, when the computer apparatus needs to adjust the power of the processor to enable the power of the processor to exceed the preset TDP, the computer apparatus can modify the parameter in the register of the second power supply controller, so that the current monitored power detected by the processor is less than the current actual power of the processor, and the actual power of the processor can exceed the preset TDP when the monitored power detected by the processor is less than the preset TDP.

Similar to the algorithm for determining the adjusted TDP of the processor provided in step S306, the monitored current adjusted by the processor may also be determined based on parameters such as a current temperature of the processor and a current rotational speed of a fan.

S506: Monitor reliability of the processor running at power exceeding the preset TDP of the processor.

Similar to step S306, when too many errors occur or running duration is excessively long when the processor runs at the power exceeding the TDP preset in the processor, an alarm is sent, or the current obtained by the processor through monitoring is increased, thereby reducing the power of the processor.

Figure 6:
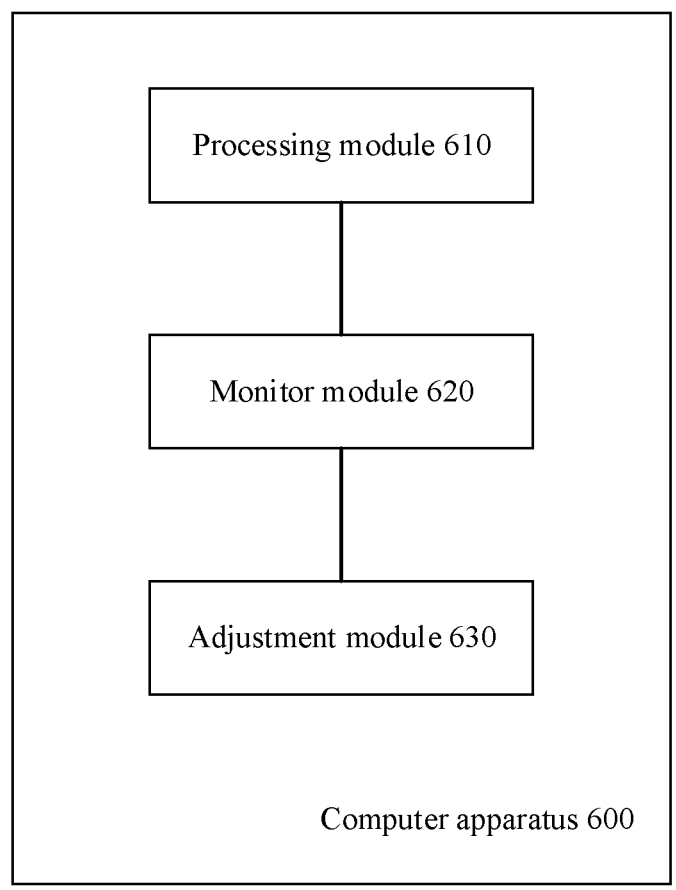
FIG. 6 is a schematic diagram of a function structure of a computer apparatus according to this disclosure.

FIG. 6 is a schematic diagram of function modules in a computer apparatus configured to adjust power of a processor according to an embodiment of this disclosure. As shown in FIG. 6, the computer apparatus 600 includes a processing module 610, a monitor module 620, and an adjustment module 630.

The monitor module 620 is configured to determine that usage of the processing module 610 exceeds a first threshold.

The adjustment module 630 is configured to adjust TDP of the processing module 610, where adjusted TDP of the processing module 610 is greater than the preset TDP of the processing module 610.

The computer apparatus 600 is further configured to perform other steps, of adjusting the power of the processor, shown in FIG. 3A, FIG. 3B, and FIG. 5. Further, the monitor module 620 is configured to perform step S301, step S302, step S303, step S304, and step S306 in FIG. 3A, step 3041 and step 3042 in FIG. 3B, and step S501, step S502, step S503, step S504, and step S506 in FIG. 5. The adjustment module 630 is configured to perform steps such as step S305 in FIG. 3A and step S505 in FIG. 5. For a specific procedure in which each module performs each step, refer to the foregoing descriptions of FIG. 3A, FIG. 3B, and FIG. 5. Details are not described herein again.

Figure 7:
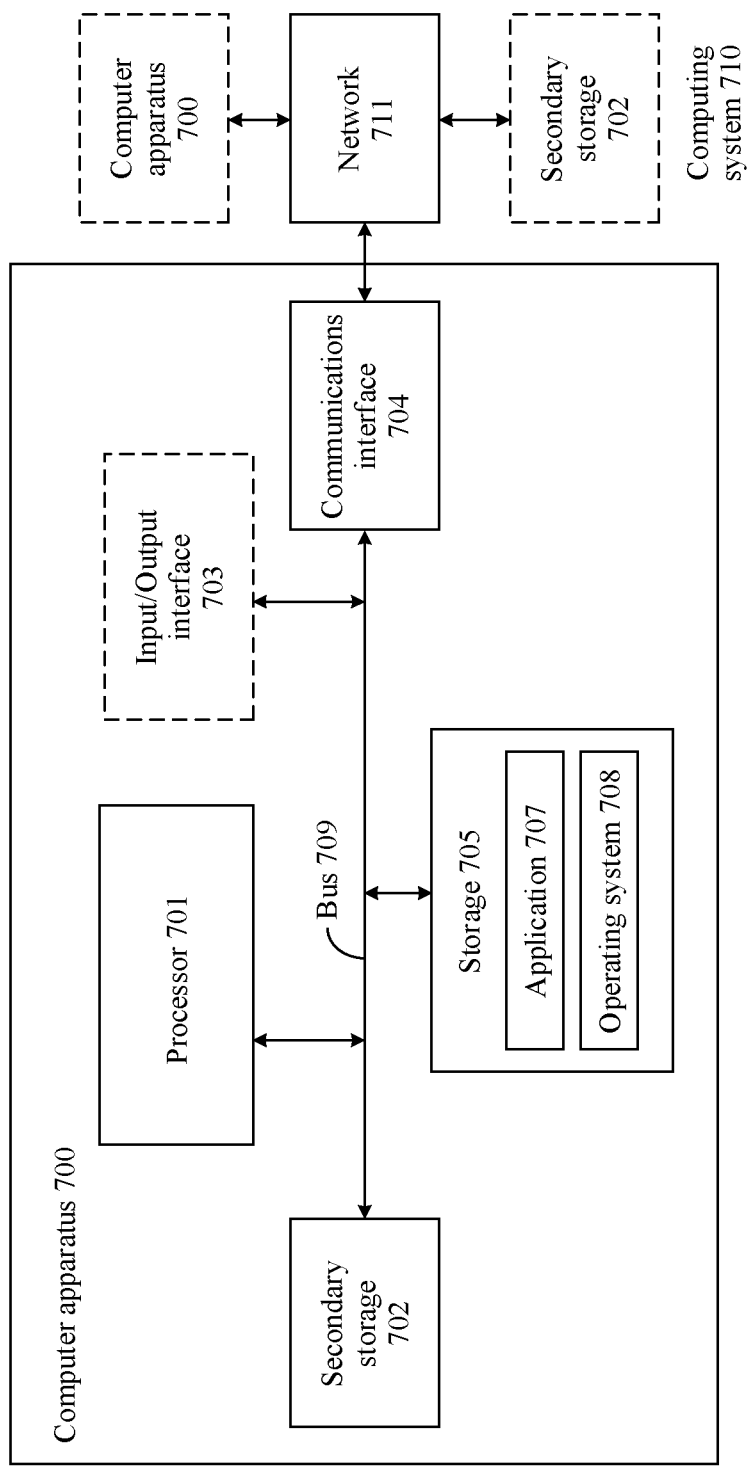
FIG. 7 is a schematic diagram of a structure of a computer apparatus according to this disclosure.

FIG. 7 is a schematic diagram of a structure of a computer apparatus 700 configured to adjust power of a processor according to an embodiment of this disclosure. The computer apparatus 700 in this embodiment may be one specific implementation of the computer apparatuses in the foregoing embodiments.

As shown in FIG. 7, the computer apparatus 700 includes a processor 701, and the processor 701 is connected to a storage 705. The processor 701 may be computational logic such as an FPGA, a digital signal processor (DSP), or a combination of any computational logic. The processor 701 may be a single-core processor or a multi-core processor.

The storage 705 may be a random-access memory (RAM), a flash memory, a read-only memory (ROM), an erasable programmable ROM (EPROM), an electrically EPROM (EEPROM), a register, or any other form of storage medium known in the art. The storage may be configured to store program instructions. When the program instructions are executed by the processor 701, the processor 701 performs the method in the foregoing embodiment.

A connection line 709 is used for transferring information between components of the computer apparatus. The connection line 709 may be connected in a wired connection manner or a wireless connection manner. This is not limited in this disclosure. The connection 709 is further connected to a communications interface 704.

The communications interface 704 implements communication with another device or a network 711 by using, for example but not limited to, a connection apparatus such as a cable or an electrical twisted wire. The communications interface 704 may also be interconnected with the network 711 in a wireless manner.

Some features in this embodiment of this disclosure may be implemented/supported by the processor 701 by executing the program instructions or software code in the storage 705. Software components loaded on the storage 705 may be summarized in terms of function or logic, for example, the monitor module 620 and the adjustment module 630 shown in FIG. 6.

In an embodiment of this disclosure, after the storage 705 loads the program instructions, the processor 701 executes a transaction related to the foregoing function/logical module in the storage.

In addition, FIG. 7 shows merely an example of the computer apparatus 700. The computer apparatus 700 may include more or fewer components than those shown in FIG. 7, or may have different component arrangements. In addition, various components shown in FIG. 7 may be implemented by using hardware, software, or a combination of hardware and software. For example, the storage and the processor may be implemented in one module. Instructions in the storage may be written into the storage in advance, or may be loaded in a subsequent execution process of the processor.

Figure 8:
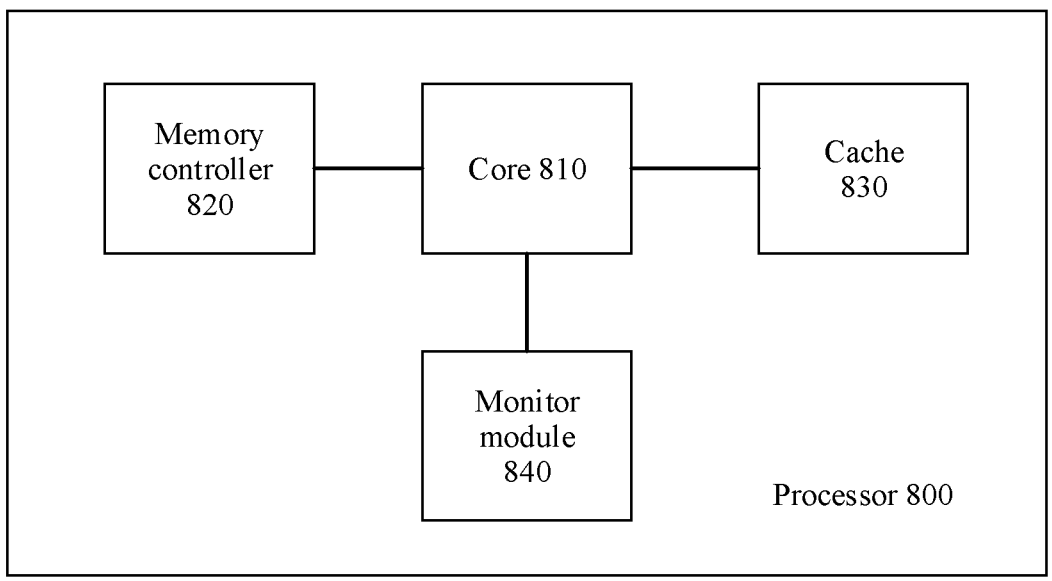
FIG. 8 is a schematic diagram of a structure of a processor according to this disclosure.

FIG. 8 is a schematic diagram of a structure of a processor 800 configured to adjust power of the processor according to an embodiment of this disclosure.

As shown in FIG. 8, the processor 800 includes a core 810, a memory controller (MC) 820, a cache 830, and a monitor module 840. The core 810 is a computing unit inside the processor, is a core component of the processor, and is responsible for providing computing power for the processor. The MC 820 is responsible for interaction between the processor and the memory. The MC 820 is a bus circuit controller configured to manage and plan a transmission speed from the memory to the processor. The MC 820 may be an independent chip, or may be integrated into a related large chip. The cache 830 is a component configured to reduce average time required by the processor to gain access to the memory. A capacity of the cache 830 is far less than a capacity of the memory, but a speed may be close to a frequency of the processor.

The processor 800 further includes a monitor module 840. The monitor module 840 may monitor parameters of the processor 800, for example, a frequency, a voltage, and a temperature of the core, and may obtain a current of the processor 800 from a second power supply controller connected to the processor. The monitor module 840 may obtain the power of the processor 800 based on the voltage of the processor and the obtained current. When the power is close to TDP corresponding to the processor 800, the monitor module 840 sends instructions to the core 810, to reduce the power of the processor 800 by reducing the frequency of the core.

The core 810 may load the instructions in the memory or the cache 830 to execute the instructions and invoke the monitor module 840 to execute the procedures in FIG. 3A, FIG. 3B, and FIG. 5 of this disclosure. For example, the monitor module 840 may determine that usage of the processor exceeds a first threshold, and the core may be configured to adjust TDP of the processor. The monitor module 840 may be an independent component. For example, the monitor module 840 may be minimum instruction set computer (MISC) I/O. The apparatus is an I/O bus interface around the processor, and may have a built-in sensor to monitor the voltage of the processor and obtain the current of the processor through the bus. The monitor module 840 may also be integrated into another component. For example, the monitor module 840 may be integrated into the core 810. This is not limited in this disclosure.

What is claimed is:

1. A method, comprising:
    monitoring a processor to detect that a usage of the processor exceeds a first threshold;
    adjusting a preset thermal design power (TDP) of the processor to obtain an adjusted TDP of the processor by enabling an adjusted power of the processor to be less than a current actual power of the processor, wherein the adjusted TDP is greater than the preset TDP;
    monitoring a quantity of errors that occur in the processor within a period of time; and
    reducing the preset TDP when the quantity of errors is greater than or equal to a second threshold.

2. The method of claim 1, wherein before adjusting the preset TDP, the method further comprises:
    monitoring the processor to obtain a current temperature of the processor; and
    calculating that a difference between a highest temperature that can be tolerated by the processor and the current temperature is greater than or equal to a third threshold.

3. The method of claim 2, wherein before adjusting the preset TDP, the method further comprises:
    monitoring a rotational speed of a fan that is configured to dissipate heat for the processor to obtain a current rotational speed; and
    calculating a ratio of the current rotational speed to a maximum rotational speed of the fan that is less than or equal to a fourth threshold.

4. The method of claim 3, further comprising calculating, based on the difference and the ratio, the adjusted TDP.

5. The method of claim 1, wherein before adjusting the preset TDP, the method further comprises:
    predicting an increment in the preset TDP;
    sending, to a power supply controller, an electric energy request carrying information about the increment; and
    receiving, from the power supply controller, a response indicating that the power supply controller has allocated electric energy corresponding to the increment.

6. The method of claim 1, wherein after adjusting the preset TDP, the method further comprises:
    monitoring a duration that the processor runs at a second power that exceeds the preset TDP; and
    sending an alarm when the duration exceeds a third threshold.

7. The method of claim 1, further comprising further adjusting the preset TDP using a basic input/output system (BIOS).

8. The method of claim 1, further comprising further adjusting the preset TDP using a baseband management controller (BMC).

9. A method comprising:
    monitoring parameters of a processor to obtain a first current corresponding to the processor;
    detecting, based on the parameters, that a usage of the processor exceeds a first threshold;
    adjusting, in response to the usage exceeding the first threshold, the first current to an adjusted current of the processor by enabling an adjusted power of the processor to be less than a current actual power of the processor, wherein the adjusted current is less than an actual current of the processor;
    monitoring a quantity of errors that occur in the processor within a period of time; and
    reducing a preset thermal design power (TDP) of the processor when the quantity of errors is greater than or equal to a second threshold.

10. The method of claim 9, further comprising:
    calculating a difference between a highest temperature of the processor and a current temperature of the processor;
    monitoring the parameters of the processor to obtain a ratio of a current rotational speed of a fan that is configured to dissipate heat for the processor to a maximum rotational speed of the fan; and
    calculating, based on the difference and the ratio, the adjusted current.

11. The method of claim 9, further comprising:
    monitoring the processor to obtain a current temperature of the processor; and
    calculating that a difference between a highest temperature that can be tolerated by the processor and the current temperature is greater than or equal to a third threshold.

12. The method of claim 11, wherein before adjusting the preset TDP, the method further comprises:
    monitoring a rotational speed of a fan that is configured to dissipate heat for the processor to obtain a current rotational speed; and
    calculating a ratio of the current rotational speed to a maximum rotational speed of the fan that is less than or equal to a fourth threshold.

13. An apparatus, comprising:
    a memory configured to store instructions; and
    a processor coupled to the memory and configured to execute the instructions to cause the apparatus to:
        monitor the processor to detect that a usage of the processor exceeds a first threshold;
        adjust a preset thermal design power (TDP) of the processor to obtain an adjusted TDP of the processor by enabling an adjusted power of the processor to be less than a current actual power of the processor, wherein the adjusted TDP is greater than the preset TDP;
        monitor a quantity of errors that occur in the processor within a period of time; and
        reduce the preset TDP when the quantity of errors is greater than or equal to a second threshold.

14. The apparatus of claim 13, wherein the processor is further configured to execute the instructions to cause the apparatus to:

monitor the processor to obtain a current temperature of the processor; and calculate that a difference between a highest temperature that can be tolerated by the processor and the current temperature is greater than or equal to a third threshold.

15. The apparatus of claim 14, wherein the processor is further configured to execute the instructions to cause the apparatus to:

monitor a rotational speed of a fan that is configured to dissipate heat for the processor to obtain a current rotational speed; and calculate a ratio of the current rotational speed to a maximum rotational speed of the fan that is less than or equal to a fourth threshold.

16. The apparatus of claim 15, wherein the processor is further configured to execute the instructions to cause the apparatus to determine, based on the difference and the ratio, the adjusted TDP.

17. The apparatus of claim 13, wherein the processor is further configured to execute the instructions to cause the apparatus to:

determine an increment in the preset TDP;

send, to a power supply controller, an electric energy request carrying information about the increment; and receive, from the power supply controller, a response indicating that the power supply controller has allocated electric energy corresponding to the increment to the apparatus.

18. The apparatus of claim 13, wherein the processor is further configured to execute the instructions to cause the apparatus to:

monitor a duration that the processor runs at a power exceeding the preset TDP; and send an alarm when the duration exceeds a third threshold.

19. The apparatus of claim 13, further comprising a basic input/output system (BIOS), wherein the processor is further configured to execute the instructions to cause the apparatus to further adjust, using the BIOS, the preset TDP.

20. The apparatus of claim 13, further comprising a baseband management controller (BMC), wherein the processor is further configured to execute the instructions to cause the apparatus to further adjust, using the BMC, the preset TDP.

* * * * *